Dec. 27, 1960     I. CHODAN     2,966,318
VARIABLE PITCH MEANS FOR VERTICALLY RISING PLANE
Filed May 12, 1959     5 Sheets-Sheet 1
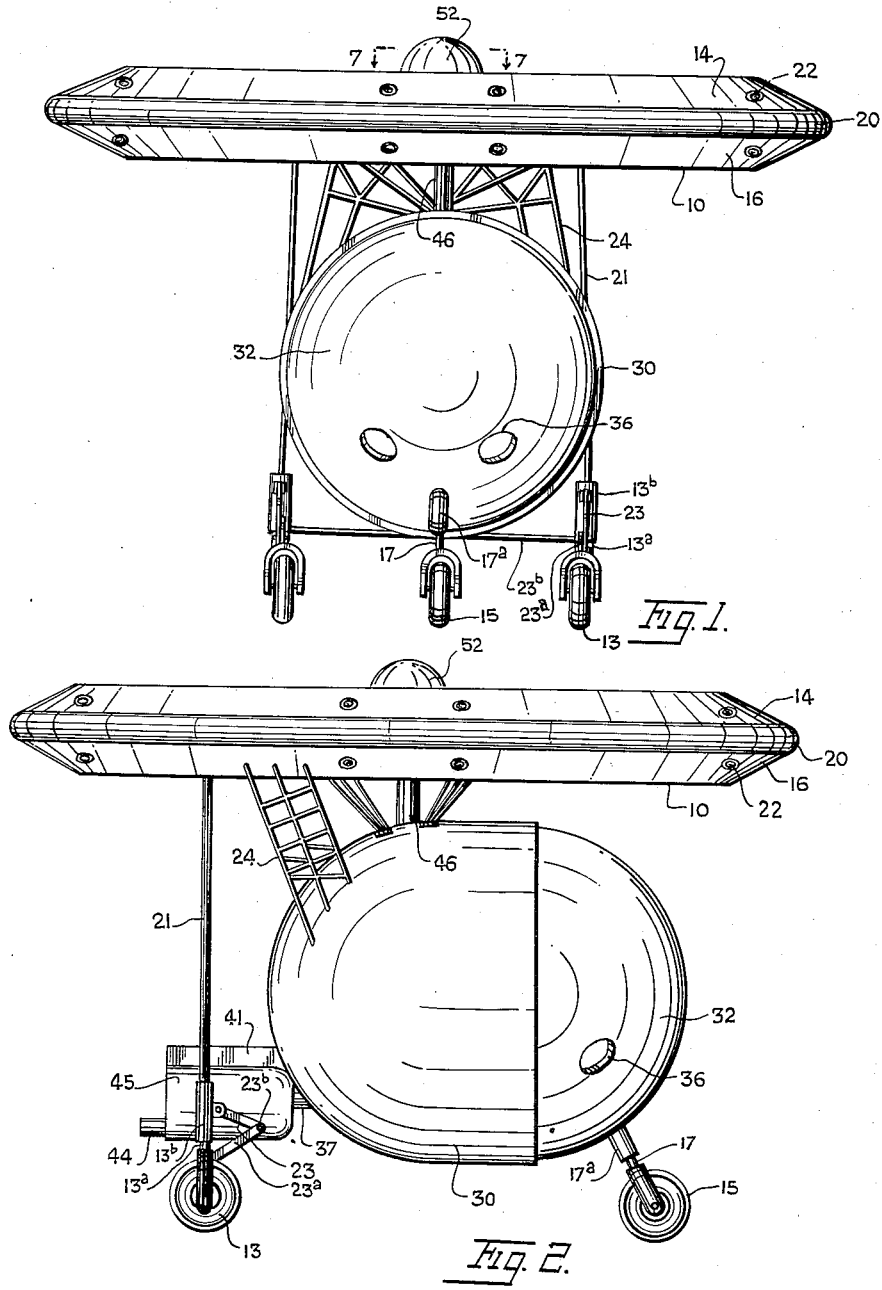
INVENTOR.
IVAN CHODAN
BY
*Zoltan Holechek*
ATTORNEY

INVENTOR.
IVAN CHODAN
BY
ATTORNEY

Dec. 27, 1960     I. CHODAN     2,966,318
VARIABLE PITCH MEANS FOR VERTICALLY RISING PLANE
Filed May 12, 1959     5 Sheets-Sheet 3

INVENTOR.
IVAN CHODAN
BY
*ATTORNEY*

Dec. 27, 1960     I. CHODAN     2,966,318
VARIABLE PITCH MEANS FOR VERTICALLY RISING PLANE
Filed May 12, 1959     5 Sheets-Sheet 4

INVENTOR
IVAN CHODAN
BY
ATTORNEY

Dec. 27, 1960      I. CHODAN      2,966,318
VARIABLE PITCH MEANS FOR VERTICALLY RISING PLANE
Filed May 12, 1959      5 Sheets-Sheet 5

INVENTOR.
IVAN CHODAN
BY
*ATTORNEY*

United States Patent Office 2,966,318
Patented Dec. 27, 1960

2,966,318
VARIABLE PITCH MEANS FOR VERTICALLY RISING PLANE
Ivan Chodan, R.D. 1, Ringoes, N.J.
Filed May 12, 1959, Ser. No. 812,752
5 Claims. (Cl. 244—23)

This invention relates to aircraft, and particularly to propeller sustained aircraft.

The invention has as a principal object to provide an aircraft having the maneuverability of a helicopter and the horizontal flight characteristics comparable to those of an airplane.

A further object is to provide a propeller sustained helicopter type aircraft provided with supplementary ailerons for guiding the aircraft laterally.

Another object is to provide an aircraft with a variable pitch propeller assembly for controlling the lift of the aircraft and with adjustable ailerons for controlling speed and direction of lateral motion.

Another object is to provide an aircraft having a rotatable variable pitch propeller assembly rotatable in a cylindrical ring to develop a down-draft therein, and with ailerons disposed below the propellers in the ring and pivotable in the down-draft to convert the down-draft forces to horizontal propulsion forces for moving the aircraft in forward, rearward and lateral directions and for executing turning movements.

A still further object is to provide an aircraft of the character described with a body suspended from the ring for carrying passengers and for supporting a power plant.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of the aircraft embodying the invention.

Fig. 2 is a side elevational view of the aircraft.

Fig. 6 is a sectional view of the ring and structure contained therein taken on line 6—6 of Fig. 5 but on the same scale as that of Fig. 4.

Figure 4:
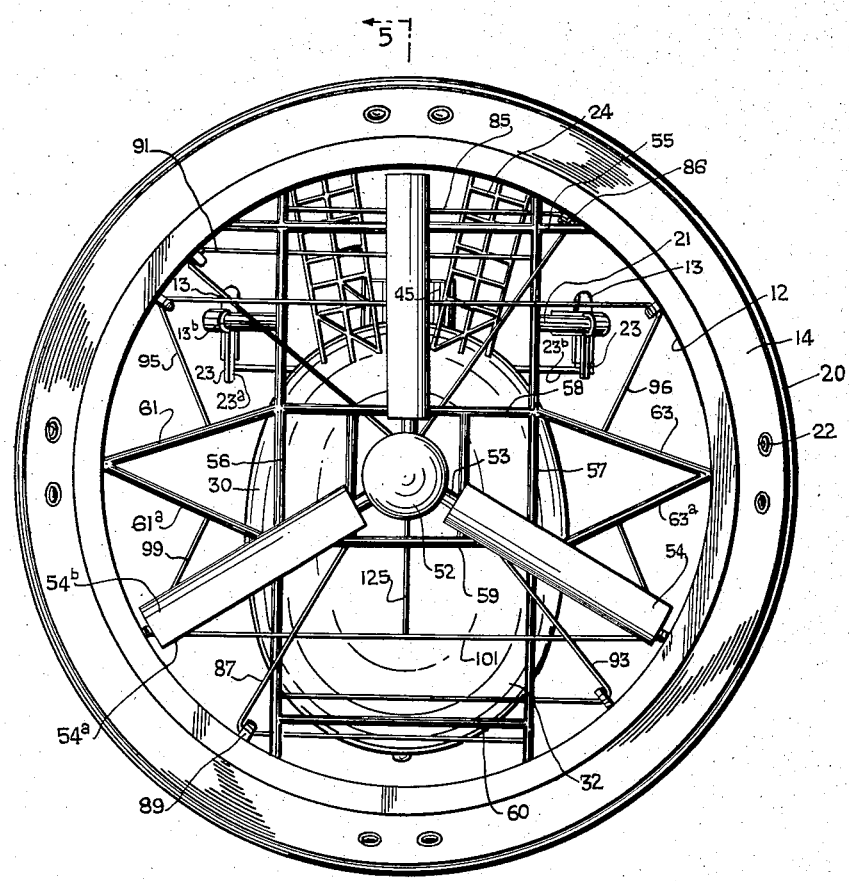
Fig. 4 is a top plan view of the aircraft.

Referring to Figs. 1–5, the aircraft is shown as including a hollow ring 10 having an inner cylindrical wall 12 and outer inclined walls 14 and 16 shaped to form a hollow chamber 18 within the ring. At the outwardly tapered center of the ring is mounted a resilient rubber ring 20 which serves as a bumper for the ring to take up mechanical shocks which may be imparted to the aircraft when it is hovering near some stationary object or an adjacent aircraft of similar structure. In the inclined walls 14 and 16 are mounted lamps 22. These lamps may be energized via wires 19 by local batteries (not shown) disposed in the chamber 18.

Figure 3:
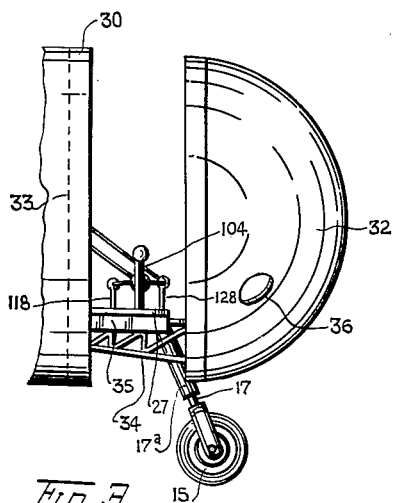
Fig. 3 is a fragmentary side elevational view with the body of the aircraft open.

Attached to the lower wall 16 is a tubular framework 24. This framework is suspended from the ring 10 and is attached to a lower vertically extending framework 26 and a vertical curved framework 28 best shown in Fig. 5. The frames 26 and 28 are disposed in and surrounded by a transparent plastic body 30. This body is substantially ellipsoidal in shape, with a circular cross section and substantially elliptical longitudinal section. The body 30 is securely joined to the frames 24, 28. Frame 26 is secured to a chassis or gear body 25 at the base of the body 30. The front or forward end of the body is made with a separable substantially ellipsoidal segment 32 which fits into a recess 33 in the central section of the body. The segment 32 is carried on a pair of girders 34 slidably supported by channel bars 35 attached to base plate 27 at gear body 25. This arrangement permits the front segment 32 to be pulled or pushed forward to open the body as shown in Fig. 3. Holes 36 are provided in the segment 32 to admit air and to provide hand grips for opening the body by pulling segment 32 forwardly.

Disposed on chassis 25 and body 30 are seats 40 and 42 for the passengers of the aircraft. The pilot of the aircraft occupying the front seat 42. Tail pipe 44 extends rearwardly from the engine 45 which is supported by plate 41 attached to chassis 25. A hollow sleeve shaft 46 is journaled in a bearing 48 on the chassis 25. This shaft extends vertically upward and terminates at a horizontal plate 50 to which is removably attached a head 52 of a propeller assembly. Three propeller blades 54 are disposed radially and horizontally with respect to the head 52, and terminate near the wall 12. Each propeller has a shaft 53 extending into the head and engaged in a pitch changing mechanism described below.

Figure 5:
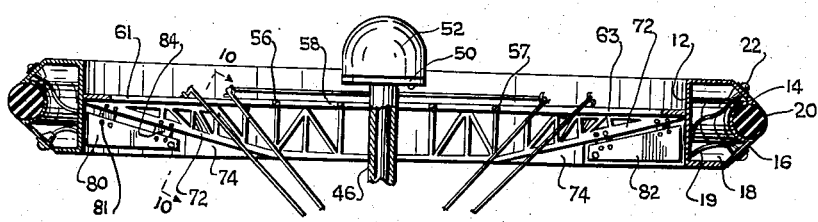
Fig. 5 is a sectional view on an enlarged scale taken on line 5—5 of Fig. 4.
Figure 5:
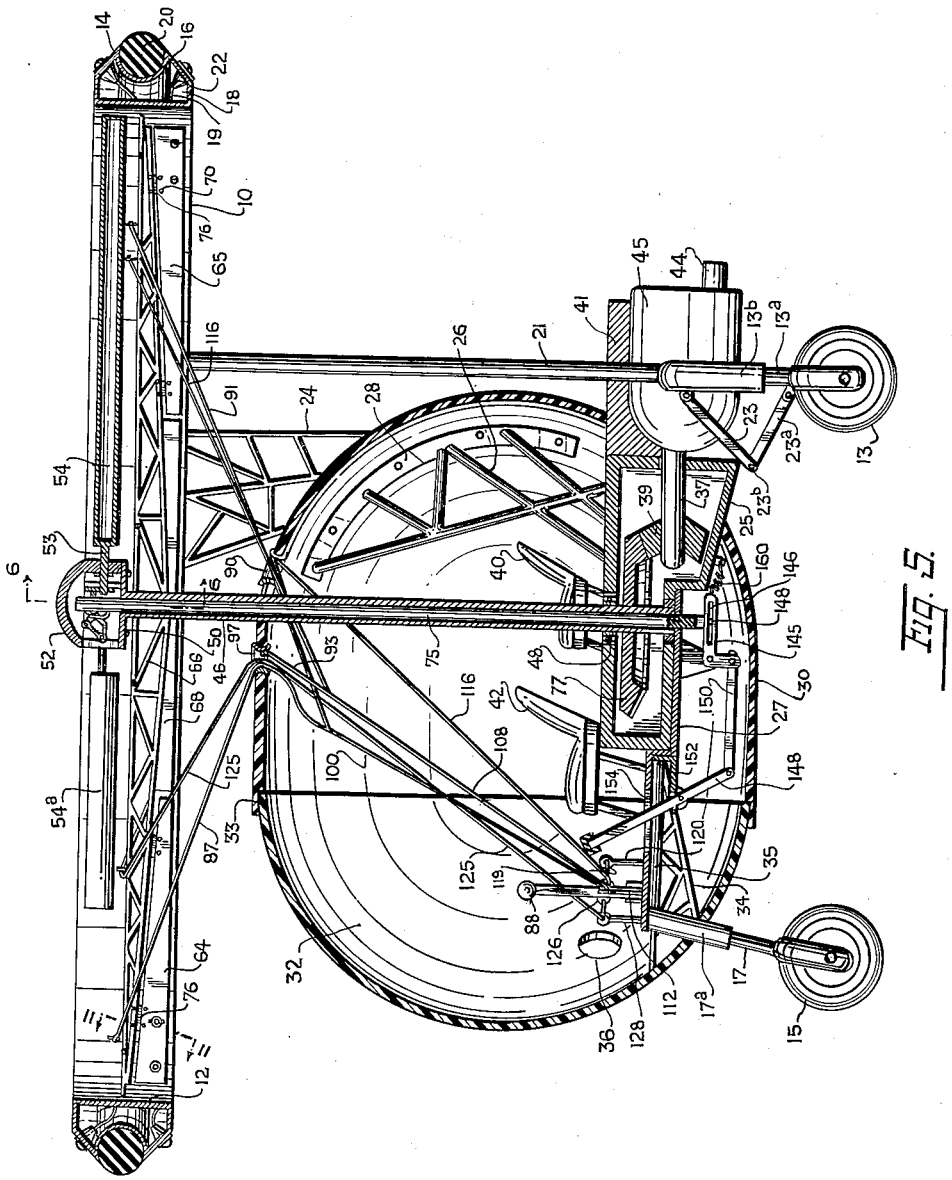
Figure 7:
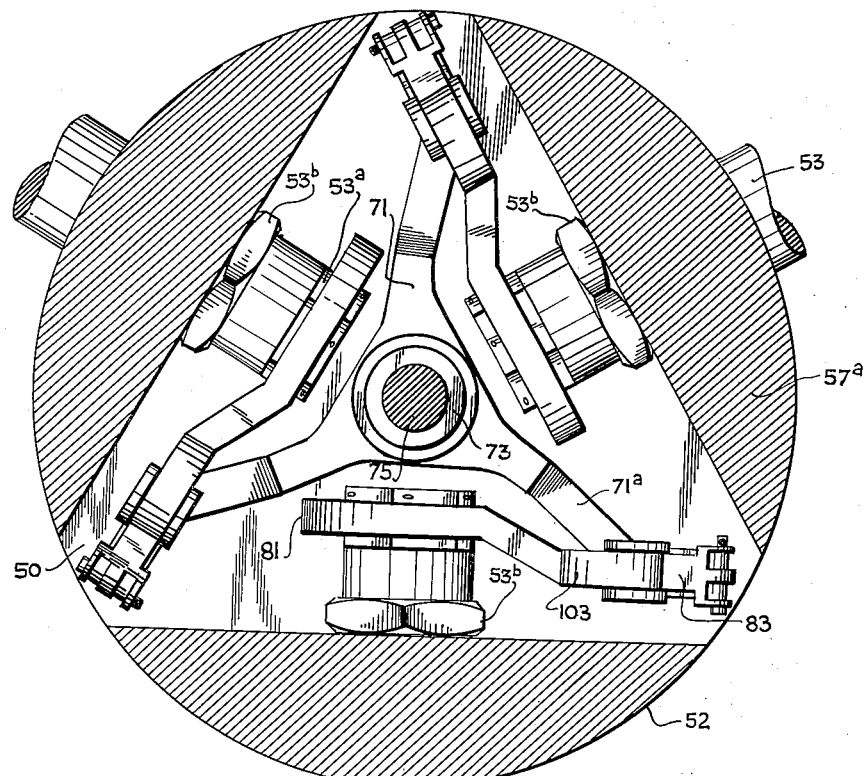
Fig. 7 is a cross-sectional view on an enlarged scale of a propeller assembly head taken on line 7—7 of Fig. 1.
Figure 11:
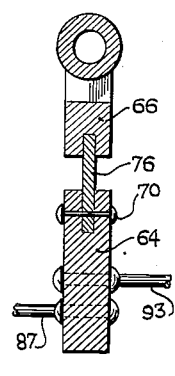
Fig. 11 is a view similar to Fig. 10 of another portion of the aileron structure taken on line 11—11 of Fig. 5.
Figure 12:
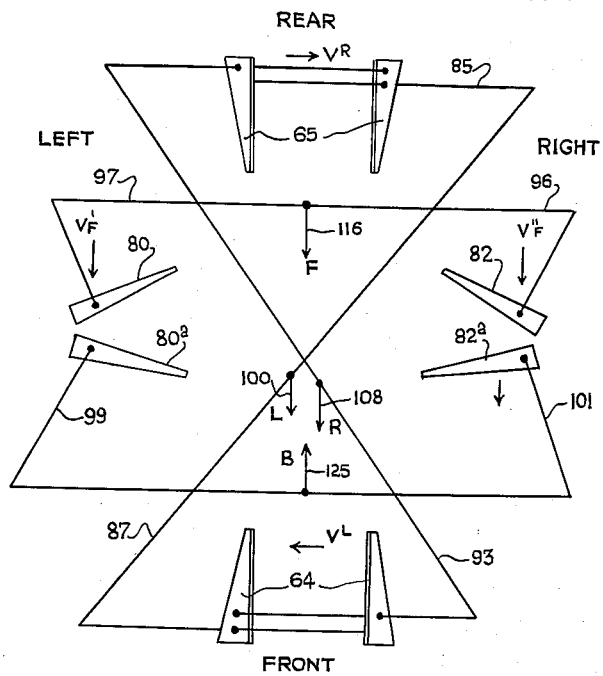
Fig. 12 is a schematic representation of the aileron control system of the aircraft.

Disposed beneath the propellers 54 and attached to wall 12 is a rectangular frame having a pair of longitudinally extending frame members 56 and 57, best shown in Fig. 4. These frame members are joined by transversely extending frame members 55, 58, 59 and 60. Two frame members 61 and 61ᵃ extend obliquely between the longitudinally extending frame member 56 and wall 12. Another two frame members 63 and 63ᵃ extend obliquely between the frame member 57 and wall 12. The longitudinally extending frame members 56 and 57 each supports two trapezoidal plates 64 and 65 which serve as ailerons. As best shown in Figs. 5 and 12, the longitudinal frame members have brace bars 66 to which are attached longitudinally extending triangular plates 68. Aligned with plates 68 are the laterally movable ailerons 64, 65. These ailerons may be attached by rivets 70 to leaf springs 76 secured to bars 66 so that the ailerons are normally disposed vertically as shown in Figs. 5 and 11. In order to tilt the ailerons laterally there is provided a system of steel wire cables described below.

Figure 10:
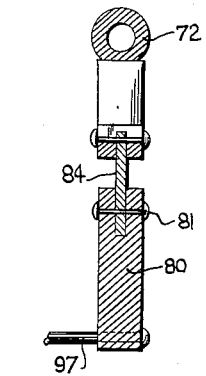
Fig. 10 is a sectional view on an enlarged scale of a portion of the aileron structure of the aircraft, taken on line 10—10 of Fig. 6.

Frame members 61, 61ᵃ, 63, 63ᵃ support brace bars 72 from which are suspended triangular plates 74 as best shown in Fig. 6. These plates are aligned with trapezoidal ailerons 80, 82 on members 61, 63 and ailerons 80ª, 82ª on members 61ª, 63ª. The ailerons impart lateral turning motion to the aircraft. Ailerons 80, 80ª, 82, 82ª are secured by rivets 81 to leaf spring members 84 attached to bars 72 as shown in Figs. 6 and 10. These ailerons are tilted by means of cables in the aileron actuating system best shown in Figs. 4 and 12.

Figure 14:
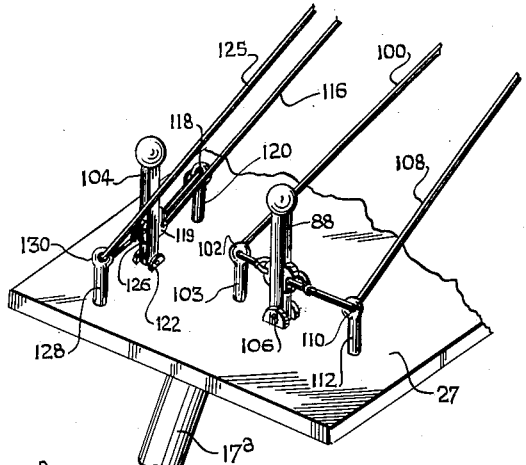
Fig. 14 is a perspective view of aileron controls employed in the aircraft.

The rear longitudinally extending ailerons 65 are joined by a first cable 85 which passes through an eye 86 secured to the wall 12 and terminates at a handle 88 located in the body 30 in front of seat 42 where it can be operated by the pilot of the aircraft. The cable 85 passes through eyelet 90 mounted in the top of the body as best shown in Fig. 5. Cable 85 is joined to another cable 87 connected to the front ailerons 64 and passing through an eye 89 at wall 12 and eyelet 95 in body 30. The cables 85 and 87 are connected to a common cable 100 which passes through eye 102 of post 103 and terminates at handle 88 as clearly shown in Fig. 14. Post 103 is mounted on plate 27 on which handle 88 is pivotally mounted by trunnion bracket 106. When handle 88 is pivoted to the left cable 100 is pulled which causes ailerons 64, 65 to be tilted so that the aircraft turns to the left with respect to the pilot's position at seat 42. Cables 91, 93 are connected to the rear and front ailerons to tilt the ailerons 65, 64 oppositely to the direction of tilt produced by cables 85, 87. Cables 91, 93 pass through eyelets 90, 95 and are joined to common cable 108. Cable 108 terminates at eye 110 of post 112 on plate 27. When the handle 88 is moved to the right, cable 108 is pulled and the aircraft turns right. When the handle 88 is released the springs 76 restore the ailerons and handle to vertical positions.

Cables 97, 96 are connected to rear sides of obliquely extending ailerons 80 and 82. Cable 116 is connected in common to the cables 97, 96 and terminates at eye 118 on post 120. The cable passes through eye 119 on handle 104. When handle 104 is pivoted forwardly in trunnion bracket 122, the aircraft moves forwardly as ailerons 80, 82 are tilted. Cables 99 and 101 are connected to forward sides of obliquely extending ailerons 80ª and 82ª as indicated in Figs. 4 and 12. Common cable 125 is connected to cables 99, 101 and terminates at eye 126 of handle 104. The cable passes through eye 130 on post 128 mounted on plate 27. When handle 104 is tilted backwardly on brackets 122, the ailerons 80ª and 82ª are tilted forwardly and the aircraft moves rearwardly.

The propellers 54 have forward or leading curved edges 54ª and trailing feathered edges 54ᵇ as clearly shown in Figs. 4 and 5. In order to tilt or vary the pitch of these propellers there is provided the mechanism best shown in Figs. 5, 7–9. The propeller shafts 53 are cylindrical in form and are journaled in bearings 53ᵇ to rotate in the partially cylindrical segments 57ª of the head 52. Each shaft terminates in a hexagonal end 53ª. The hexagonal end of each shaft is fixed in a hexagonal aperture 81ª of a crank lever 81. This lever has an arm 103 pivotally engaged by a pin 105 with one slotted end of a link 83. The other slotted end of the link is pivotally engaged by a pin 107 with one arm 71ª of a triple arm pusher plate 71. This plate is rigidly secured by means of ring 73 to a vertical rod 75. Rod 75 is axially slidable in the sleeve shaft 46, as best shown in Fig. 5. There are provided three links 83 attached to the respective arms 71ª for tilting the propellers of the aircraft.

Rod 75 passes through gear box 25 and at its free lower end is pivotally attached to a bell crank lever 145 having a slot 146 engaged with a pin 148 at the lower end of rod 75. Link 150 is pivotally attached to lever 145. Handle 148 is pivotally mounted on bracket plate 152 and passes upwardly through a slot 154 in the base plate 27. The handle 148 is disposed for actuation by the pilot who sits on seat 42. When the pilot pulls handle rearwardly toward himself, the rod 75 is pulled downwardly. When the pilot pushes the handle forwardly the rod 75 is raised, to tilt the propellers 54 accordingly. Spring 160 attached to lever 145 and box 25 holds lever 145 in a neutral position. When the rod 75 is in a neutral position the propellers 54 are horizontally disposed for normally sustaining the aircraft in a horizontal flight or hovering position.

The engine 45 has a drive shaft 37 terminating in a bevel gear 39. This gear drives a companion bevel gear 77 in chassis 25 mounted at the lower end of shaft 46.

In order to support the aircraft when it is on the ground, there are provided wheels 13 and 15. Wheel 15 is rotatably carried by a forwardly extending leg 17 disposed in a shock absorber cylinder 17ª attached to base plate 27. Wheels 13 are carried by legs 13ª in cylindrical shock absorbers 13ᵇ at the ends of posts 21. Links 23, 23ª are connected between the shock absorbers and legs 13ª and are joined by crossbar 23ᵇ. Posts 21 are joined at their upper ends to horizontal bars 56 and 57 in ring 10.

Figure 8:
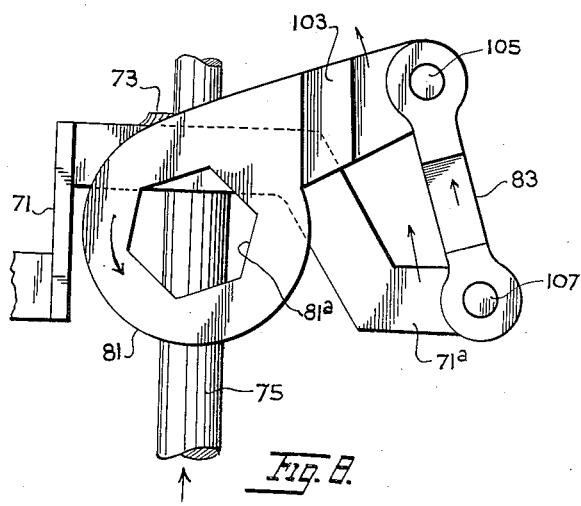
Fig. 8 is an elevational sectional view on an enlarged scale of a portion of the mechanism for varying the pitch of the propellers of the aircraft.
Figure 9:
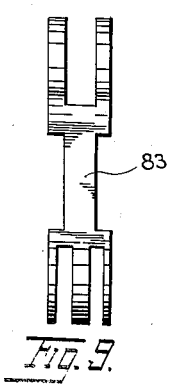
Fig. 9 is a side elevational view of a link in the mechanism of Fig. 8.

To operate the propeller pitch changing mechanism the pilot will raise or lower handle 148. This will cause rod 75 to be moved axially within sleeve shaft 46. The movement of rod 75 raises or lowers plate 71 in head 52 causing links 103 to be raised or lowered so that levers 81 pivot angularly and cause the propeller blades 54 whose shafts 53 are journaled in head elements 57 to tilt from the normal horizontal plane of rotation of the blades on shaft 46. In Fig. 8 the arrows indicate the relative movements of rod 75, arms 71ª, links 83 and levers 81 to effect a counterclockwise tilting of the propeller blades. When rod 75 is raised, the propeller blades tilt counterclockwise. When the rod is lowered, the blades are tilted clockwise.

In operation of the aircraft, the engine causes rotation of the sleeve shaft 46 to turn head 52 and rotate the propeller blades in a horizontal plane within the ring 10. The blades are shaped to present substantially rectangular curved and inclined bottom surfaces to the supporting aircraft. The blades create a vertical down-draft through the ring which is opposed by the air beneath the blades so that the aircraft is sustained in the air. This elevating effect is variable by tilting the blades to vary their pitch. If the pitch is made steeper, the blades will exert a greater "bite" on the air and the aircraft will rise. If the pitch is lessened to level the blades the bite can be reduced so that lifting effect is lessened and the aircraft will hover in air. The tilt of the blades can be reversed so that the rotating blades assist the force of gravity to speed the descent of the aircraft or to adjustably control the speed of descent.

The down-draft created and maintained by the propeller blades in the ring 10 may be used to cause the aircraft to move in fore or aft directions. When the ailerons 80, 80ª and 82, 82ª are vertical there is no fore and aft motion of the aircraft. If ailerons 80 and 82 are tilted rearwardly as indicated in Fig. 12, their rear surfaces slant downward to the rear. The down-draft applied to these surfaces causes the aircraft to move forwardly. This tilting of the ailerons is effected by pushing handle 104 forwardly to accomplish the forward movement described. If the handle 104 is pulled rearwardly, a backward movement of the aircraft is effected as the ailerons 80ª, 82ª tilt so that their forward faces are uppermost and slant forwardly. The arrows V'$_F$ and V"$_F$ adjacent to ailerons 80, 82 in Fig. 12 indicate the component vectors of forces of the applied forces when the ailerons 80 and 82 are tilted for forward motion of the aircraft.

Figure 13:
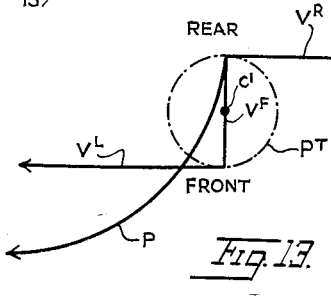
Fig. 13 is a vector diagram employed in explaining the lateral motion of the aircraft.

The down-draft created and maintained by the rotating propeller blades is further effective to cause turning movements of the aircraft. When the ailerons 64 and 65 are vertical no turning movement occurs. If the handle 88 is moved to the right cable 91 tilts ailerons 65 to the left and cable 93 tilts ailerons 64 to the right as indicated in Fig. 12. Then the down-draft produces component forces in a horizontal plane as indicated by the arrows $V_R$ and $V_L$ in Figs. 12 and 13. Fig. 13 is a resultant force diagram. Vectors $V_R$ and $V_L$ constitute a couple which will cause rotation of the aircraft on an axis passing through its center of gravity C. Vector $V_R$ is the resultant of forces in a horizontal plane applied to ailerons 65, while vector $V_L$ is the resultant of forces in a horizontal plane applied to the ailerons 64 when tilted as shown in Fig. 13.

$P_T$ represents the circular path of turning of the aircraft due only to the vector couple $V_R$ and $V_L$. Vector $V_F$ represents the resultant in a horizontal plane of the force vectors $V'_F$ and $V''_F$, these latter vectors being the effective components of the down-draft forces in a horizontal plane tending to move the aircraft forward. The aircraft follows a resultant path P as indicated in Fig. 13 due to the curved clockwise turning couple $V_R$ and $V_L$ and the forward directed vector $V_F$. Thus, when the pilot operates handles 88 and 104 simultaneously he effects this composite movement in path P.

If only handle 88 was pulled to right or left then the aircraft would turn clockwise or counterclockwise, all when viewed from above the aircraft in plan. If only handle 104 was pulled the aircraft would move backward. If only handle 104 was pushed the aircraft would move forward. If none of the handles was pulled or pushed the aircraft would hover in air. If handle 148 is raised it increases the pitch of the blades and increases the down-draft so that greater speed in turning and fore and aft movements can be obtained, in addition to elevating the aircraft.

Since the aircraft is capable of hovering, it accomplishes one of the principal functions of a helicopter. Since it is capable of turning and moving forwardly it performs functions of an airplane. Since the aircraft is also capable of moving rearwardly and turning on its center of gravity it performs functions which exceed the normal moving capacity of a conventional airplane. The vertical movements of the aircraft are characteristic of a helicopter. All of these varied movements are accomplished with a relatively simple tailless structure. The body of the aircraft is suspended from the ring in which the moving forces are generated. It does not directly support ailerons, airfoils or rudder as in conventional airplanes and helicopters. Thus, a much simpler body structure is possible.

The body structure 30, in one practical embodiment, was made fifty-eight inches wide and seventy inches long, capable of carrying two or three passengers. It employed an eighty-five horsepower air-cooled aircraft engine. The ring 10 was about twelve feet in diameter externally and the inner wall 12 had a diameter of about ten feet. The total height of the aircraft from the bottom of the wheels to the top of head 52 was about eight feet.

While I have illustrated and described the preferred embodiment of my invention, it is to be understood that I do not limit myself to the precise construction herein disclosed and that various changes and modifications may be made within the scope of the invention as defined in the appended clams.

Having thus described my invention, what I claim as new, and desire to secure by United States Letters Patent is:

1. An aircraft, comprising a ring structure, a body suspended from said structure, a propeller assembly including a plurality of propeller blades having generally rectangular longitudinal bottom surfaces rotatable in a horizontal plane within the ring, said assembly being supported by a shaft carried by said body, a plurality of frame members supported by said ring, and a plurality of ailerons disposed in the ring between the body and propeller assembly, said ailerons being plates normally disposed in vertical planes perpendicular to the plane of rotation of the propeller assembly, and means for tilting the ailerons out of said vertical planes for moving the aircraft laterally, said ailerons including a first pair thereof supported by a first frame member longitudinally in a fore and aft position with respect to said body at one side thereof, a second pair of the ailerons being supported by a second frame member longitudinally in a fore and aft position with respect to said body at the other side thereof, a third pair and a fourth pair of ailerons obliquely disposed to the fore and aft plane of said body, the first and second pairs of ailerons being effective to turn the aircraft when the first and second pairs of ailerons are tilted, the third and fourth pairs of ailerons being effective to move the aircraft in forward and rearward directions when tilted by said means.

2. An aircraft, comprising a ring structure, a body suspended from said structure, a propeller assembly including a plurality of propeller blades having generally rectangular longitudinal bottom surfaces rotatable in a horizontal plane within the ring, said assembly being supported by a shaft carried by said body, a plurality of frame members supported by said ring, and a plurality of ailerons disposed in the ring between the body and propeller assembly, said ailerons being plates normally disposed in vertical planes perpendicular to the plane of rotation of the propeller assembly, and means for tilting the ailerons out of said vertical planes for moving the aircraft laterally, said ailerons including a first pair thereof supported by a first frame member longitudinally in a fore and aft position with respect to said body at one side thereof, a second pair of the ailerons being supported by a second frame member longitudinally in a fore and aft position with respect to said body at the other side thereof, and third and fourth pairs of the ailerons obliquely disposed to the fore and aft plane of said body, the first and second pairs of ailerons being effective to turn the aircraft when the first and second pairs of ailerons are tilted, the third and fourth pairs of ailerons being effective to move the aircraft in forward and rearward directions when tilted by said means, said means comprising a system of cables connected to said ailerons and terminating in said body for actuation by the pilot thereof.

3. An aircraft, comprising a ring structure, a body suspended from said structure, a propeller assembly including a plurality of propeller blades having generally rectangular longitudinal bottom surfaces rotatable in a horizontal plane within the ring, said assembly being supported by a shaft carried by said body, a plurality of frame members supported by said ring, and a plurality of ailerons disposed in the ring between the body and propeller assembly, said ailerons being plates normally disposed in vertical planes perpendicular to the plane of rotation of the propeller assembly, and means for tilting the ailerons out of said vertical planes for moving the aircraft laterally, said ailerons including a first pair thereof supported by a first frame member longitudinally in a fore and aft position with respect to said body at one side thereof, a second pair of the ailerons being supported by a second frame member longitudinally in a fore and aft position with respect to said body at the other side thereof, a third pair and a fourth pair of the ailerons obliquely disposed to the fore and aft plane of said body, the first and second pairs of ailerons being effective to turn the aircraft when the first and second pairs of ailerons are tilted, the third and fourth pairs of ailerons being effective to move the aircraft in forward and rearward directions when tilted by said means, said means comprising a system of cables connected to said ailerons and terminating in said body for actuation by the pilot thereof, said blades being tiltable in planes relative to said horizontal plane to provide a variable pitch therefor for controlling the lift of the aircraft, and a mechanism for tilting said blades, said mechanism comprising a vertically disposed rod, a plate having radiating arms secured to said rod, a plurality of levers respectively engaged with said blades, and a plurality of links pivotally connecting said arms and levers.

4. An aircraft, comprising a ring structure, a body suspended from said structure, a propeller assembly including a plurality of propeller blades having generally rectangular longitudinal bottom surfaces rotatable in a horizontal plane within the ring, said assembly being supported by a shaft carried by said body, a plurality of frame members supported by said ring, and a plurality of ailerons disposed in the ring between the body and propeller assembly, said ailerons being plates normally disposed in vertical planes perpendicular to the plane of rotation of the propeller assembly, and means for tilting the ailerons out of said vertical planes for moving the aircraft laterally, said ailerons including a first pair thereof supported by a first frame member longitudinally in a fore and aft position with respect to said body at one side thereof, a second pair of the ailerons being supported by a second frame member longitudinally in a fore and aft position with respect to said body at the other side thereof, a third pair and a fourth pair of the ailerons obliquely disposed to the fore and aft plane of said body, the first and second pairs of ailerons being effective to turn the aircraft when the first and second pairs of ailerons are tilted, the third and fourth pairs of ailerons being effective to move the aircraft in forward and rearward directions when tilted by said means, said means comprising a system of cables connected to said ailerons and terminating in said body for actuation by the pilot thereof, said blades being tiltable in planes relative to said horizontal plane to provide a variable pitch therefor for controlling the lift of the aircraft, and a mechanism for tilting said blades, said mechanism comprising a vertically disposed rod, a plate having radiating arms secured to said rod, a plurality of levers respectively engaged with said blades, and a plurality of links pivotally connecting said arms and levers, an engine supported by said body, a sleeve shaft operatively connected to said engine and extending vertically from said body, said sleeve shaft terminating in a head member, said blades being supported by said head, said rod passing axially through said sleeve shaft and slidable therein, and a handle operatively connected to said rod for actuating the rod to tilt said blades.

5. An aircraft, comprising a ring structure, a body suspended from said structure, a propeller assembly including a plurality of propeller blades having generally rectangular longitudinal bottom surfaces rotatable in a horizontal plane within the ring, said assembly being supported by a shaft carried by said body, a plurality of frame members supported by said ring, and a plurality of ailerons disposed in the ring between the body and propeller assembly, said ailerons being plates normally disposed in vertical planes perpendicular to the plane of rotation of the propeller assembly, and means for tilting the ailerons out of said vertical planes for moving the aircraft laterally, said ailerons including a first pair thereof supported by a first frame member longitudinally in a fore and aft position with respect to said body at one side thereof, a second pair of the ailerons being supported by a second frame member longitudinally in a fore and aft position with respect to said body at the other side thereof, a third pair and a fourth pair of the ailerons obliquely disposed to the fore and aft plane of said body, the first and second pairs of ailerons being effective to turn the aircraft when the first and second pairs of ailerons are tilted, the third and fourth pairs of ailerons being effective to move the aircraft in forward and rearward directions when tilted by said means, said means comprising a system of cables connected to said ailerons and terminating in said body for actuation by the pilot thereof, said blades being tiltable in planes relative to said horizontal plane to provide a variable pitch therefor for controlling the lift of the aircraft, and a mechanism for tilting said blades, said mechanism comprising a vertically disposed rod, a plate having radiating arms secured to said rod, a plurality of levers respectively engaged with said blades, and a plurality of links pivotally connecting said arms and levers, an engine supported by said body, a sleeve shaft operatively connected to said engine and extending vertically from said body, said sleeve shaft terminating in a head member, said blades being supported by said head, said rod passing axially through said sleeve shaft and slidable therein, and a handle operatively connected to said rod for actuating the rod to tilt said blades, each of said ailerons being a flat plate-like member supported by spring means on said frame members.

References Cited in the file of this patent
UNITED STATES PATENTS

| 1,775,783 | Perrin | Sept. 16, 1930 |
| 1,849,235 | Kibbe | Mar. 15, 1932 |
| 2,404,829 | Darrow | July 30, 1946 |
| 2,777,649 | Williams | Jan. 15, 1957 |